United States Patent
Roillet et al.

(10) Patent No.: US 12,518,886 B2
(45) Date of Patent: Jan. 6, 2026

(54) DEVICE FOR EXTRACTING A NUCLEAR FUEL ROD OR A CLUSTER ROD AND EXTRACTION METHOD USING SUCH AN EXTRACTION DEVICE

(71) Applicant: FRAMATOME, Courbevoie (FR)

(72) Inventors: Serge Roillet, Lyons (FR); Jacques Gauthier, Cailloux sur Fontaines (FR); Alexis Righetti, Viviers (FR)

(73) Assignee: FRAMATOME, Courbevoie (FR)

( * ) Notice: Subject to any disclaimer, the term of this patent is extended or adjusted under 35 U.S.C. 154(b) by 340 days.

(21) Appl. No.: 18/032,184

(22) PCT Filed: Oct. 15, 2021

(86) PCT No.: PCT/EP2021/078651
§ 371 (c)(1),
(2) Date: Apr. 16, 2023

(87) PCT Pub. No.: WO2022/079262
PCT Pub. Date: Apr. 21, 2022

(65) Prior Publication Data
US 2023/0395273 A1    Dec. 7, 2023

(30) Foreign Application Priority Data

Oct. 16, 2020 (FR) ..................... 20 10631

(51) Int. Cl.
*G21C 19/26* (2006.01)
*G21C 3/334* (2006.01)
*G21C 19/10* (2006.01)

(52) U.S. Cl.
CPC ............. *G21C 19/26* (2013.01); *G21C 3/334* (2013.01); *G21C 19/10* (2013.01)

(58) Field of Classification Search
CPC ................................ G21C 19/00; G21C 19/10
See application file for complete search history.

(56) References Cited

U.S. PATENT DOCUMENTS 3,068,035 A * 12/1962 Foglia ...................... B65D 1/34
294/93
3,383,286 A * 5/1968 Paget ..................... G21C 19/16
976/DIG. 257

(Continued)

FOREIGN PATENT DOCUMENTS

| FR | 1225784 A | 7/1960 | |
|---|---|---|---|
| FR | 2894375 A1 * | 6/2007 | ............. G21C 17/00 |
| WO | WO2016097277 A1 | 6/2016 | |

OTHER PUBLICATIONS

International Search Report for PCT/EP2021/078651.

*Primary Examiner* — Lily C Garner
(74) *Attorney, Agent, or Firm* — Davidson Kappel LLC (57) ABSTRACT

An extraction device for extracting a nuclear fuel rod or a cluster rod comprises an attachment portion configured to be inserted into a sleeve of the rod through an end without an end plug, and a grip portion, the attachment portion comprising an elongated body along a longitudinal axis and at least one tooth projecting from the body, the or each tooth being configured to allow the attachment portion to be forcibly inserted into the sleeve axially, and to engage with the inner surface of the sleeve so as to prevent the attachment portion from being extracted from the sleeve.

16 Claims, 7 Drawing Sheets

(56) References Cited

U.S. PATENT DOCUMENTS

| | | | | |
|---|---|---|---|---|
| 3,802,996 | A * | 4/1974 | Jones | G21C 3/34 |
| | | | | 976/DIG. 251 |
| 4,551,299 | A * | 11/1985 | Shields | G21C 19/10 |
| | | | | 976/DIG. 251 |
| 4,651,400 | A * | 3/1987 | Shields | G21C 19/10 |
| | | | | 294/102.1 |
| 4,659,537 | A * | 4/1987 | Beuneche | G21C 3/335 |
| | | | | 976/DIG. 231 |
| 4,724,607 | A * | 2/1988 | Beuneche | G21C 19/26 |
| | | | | 976/DIG. 231 |
| 7,469,030 | B2 * | 12/2008 | Bonnamour | G21C 3/322 |
| | | | | 376/442 |
| 9,715,946 | B2 * | 7/2017 | Kurzer | G21C 3/331 |
| 2017/0352442 | A1 * | 12/2017 | Lorenzo | G21C 13/06 |

* cited by examiner

DEVICE FOR EXTRACTING A NUCLEAR FUEL ROD OR A CLUSTER ROD AND EXTRACTION METHOD USING SUCH AN EXTRACTION DEVICE

The present disclosure relates to the field of maintenance of nuclear fuel assemblies, control clusters and/or fixed clusters.

BACKGROUND

A nuclear fuel assembly comprises a bundle of nuclear fuel rods held by a framework. Each rod comprises a tubular sleeve, which encloses a fissile column formed of a stack of nuclear fuel pellets, and which is closed at both ends by end plugs welded to the sleeve.

At least one of the two end plugs has the function, in addition to that of sealing the nuclear fuel rod, of allowing the nuclear fuel rod to be grasped, for example to be extracted from of or inserted into the framework of its nuclear fuel assembly. Such an extraction or insertion is performed, for example, to repair or replace the nuclear fuel rod when it is damaged.

It is possible that a nuclear fuel rod may lose an end plug having a handling function or that it may be necessary to remove the end plug for example if the end plug is damaged. It then becomes difficult to extract the nuclear fuel rod, that has lost its handling means, out of the nuclear fuel assembly.

A bundle comprises a support structure carrying a bundle of rods (hereinafter "cluster rods") intended to be inserted into the guide tubes of a fuel assembly. Each cluster rod comprises a tubular sleeve, which encloses an absorbent column or another type of column, and which is closed at both ends by end plugs welded to the sleeve. An absorbent column contains, for example, one or more neutron absorbing materials. Columns of another type may be alumina columns, secondary source columns, or primary source columns.

It is possible for a cluster rod to become disengaged from its upper end plug and to fall into the corresponding guide tube of the nuclear fuel assembly that was receiving the bundle.

FR1225784 discloses a nuclear fuel rod removal device, comprising a tool having three claws each presenting a recess on the face of the claw contacting the outer face of the nuclear fuel rod, and a ball or roller housed in each recess and providing, upon lifting the tool, locking of the claws to the outside of the nuclear fuel rod sleeve.

EP0200988 discloses a device for extracting a nuclear fuel rod, comprising a cylindrical housing receiving a tube made of elastomer material which will cap the fuel rod and a cylindrical thrust rod mounted movably in the housing so as to laterally deform the tube made of elastomer material in order to externally clamp the sleeve of the nuclear fuel rod.

U.S. Pat. No. 4,986,955 discloses a device for extracting a peripheral nuclear fuel rod from a nuclear fuel assembly, the extraction device comprising a clamp for externally clamping the nuclear fuel rod.

KR101163118 discloses a nuclear fuel rod extraction device, comprising a circular clamp for externally clamping the rod and a pin insertable into the rod to prevent crushing of the clamped sleeve by the clamp.

SUMMARY

One of the aims of the present disclosure is to provide a device for extracting nuclear fuel rods which allows reliable and easy extraction.

To this end, the present disclosure proposes a device for extracting a nuclear fuel rod or a cluster rod, the extraction device comprising an attachment portion configured to be inserted into a sleeve of the rod through an end without a plug, and a gripping portion, the attachment portion comprising an body elongated along a longitudinal axis and at least one tooth projecting from the body, the or each tooth being configured to allow forcible insertion of the attachment portion into the cladding axially, and to engage with the inner surface of the sleeve so as to prevent extraction of the attachment portion from the sleeve.

In particular embodiments, the extraction device comprises one or more of the following optional features, taken individually or according to any technically feasible combination:

- the or each tooth is configured to resist extraction of the attachment portion from the sleeve by holding the teeth pressed against the inner surface of the sleeve;
- the attachment portion comprises a plurality of teeth distributed angularly around the body;
- the attachment portion comprises regularly angularly distributed teeth, in particular uniformly angularly distributed teeth;
- the attachment portion comprises a plurality of teeth distributed axially along the body;
- the attachment portion comprises at least one blade having a plurality of arms each forming a respective tooth;
- the attachment portion comprises a plurality of blades 22 axially spaced along the body, according to a regular or non-regular distribution;
- the blades are angularly offset from one another;
- the body comprises a plurality of axial sections stacked axially in alternation with blades;
- the axial sections comprise one or more intermediate sections interposed between two blades;
- the axial sections and the blades are stacked along a central shaft;
- the body comprises axial sections each having interlocking orientation elements offset angularly, such that two axially stacked sections are angularly offset due to the interlocking of their orientation element;
- the attachment portion has a bearing portion configured to press against an edge of the end of the sleeve due to the insertion of the attachment portion into the sleeve.
- the attachment portion has a bearing surface associated with each tooth, each bearing surface being arranged so that the tooth presses against the bearing surface when a force is applied to the extraction device in a direction to extract the attachment portion from the sleeve;
- each bearing surface is inclined relative to the longitudinal axis being oriented axially in the direction of extraction of the attachment portion from the sleeve and radially inward.

The present disclosure also relates to an assembly comprising a nuclear fuel rod or a cluster rod, and an extraction device as defined above, adapted for insertion and locking of its attachment portion within the rod sleeve.

The present disclosure also relates to a method for extracting a nuclear fuel rod or cluster rod from a nuclear fuel assembly, the rod sleeve being devoid of a closure end plug at one end, wherein the attachment portion of an extraction device such as defined above is forcibly inserted into the open end of the sleeve, then the grip portion of the extraction device is pulled to extract the rod from its nuclear fuel assembly.

BRIEF DESCRIPTION OF THE DRAWINGS

The present disclosure and its advantages will be better understood from the following description, given only by way of example, and made with reference to the attached drawings, in which.

DETAILED DESCRIPTION

Figure 1:
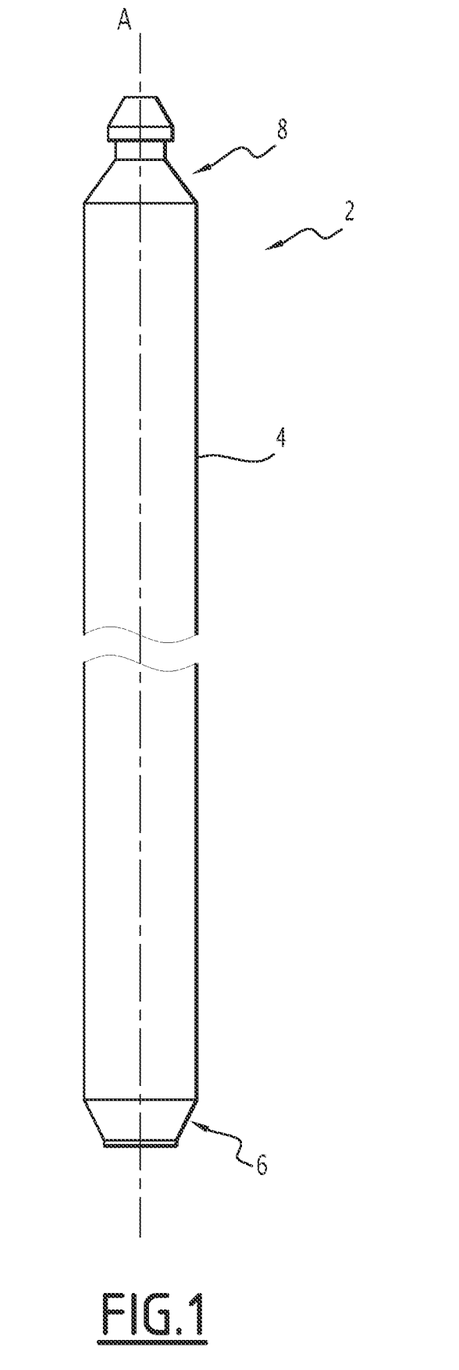
FIG. 1 is an elevation view of an undamaged nuclear fuel rod, having an upper end plug configured for handling the rod, and a bottom end plug that is not.

In FIG. 1, an undamaged nuclear fuel rod 2 comprises a tubular sleeve 4 extending along a longitudinal axis A, intended to receive a fissile column formed of cylindrical nuclear fuel pellets (not shown) stacked axially within the sleeve 4.

The rod 2 is intended to be integrated into a nuclear fuel assembly comprising a bundle of parallel rods, held together by a nuclear fuel assembly framework comprising a lower nozzle and an upper nozzle.

In operation, in the core of a nuclear reactor or in a handling or storage pool, the nuclear fuel assembly rests vertically supported on its lower nozzle, each rod extending vertically.

In the remainder of the description, the terms "upper" and "lower" are understood to refer to the usual vertical orientation of a rod in a nuclear fuel assembly resting on its lower nozzle.

The undamaged rod 2 has end plugs closing the ends of the sleeve 4. In particular, the rod 2 has a lower end plug 6 closing the lower end of the sleeve 4, and an upper end plug 8 closing the upper end of the sleeve 4.

As shown in FIG. 1, the lower end plug 6 does not have a handling function, in other words, it is not configured for handling the rod 2. In contrast, the upper end plug 8 has a handling function, in other words, it is configured for handling the rod 2 by an associated handling tool (not shown)

More specifically, the upper end plug 8 is configured to allow the rod 2 to be extracted from its nuclear fuel assembly by pulling the rod 2 upward, out of the nuclear fuel assembly with an extraction tool suitable for gripping the upper end plug 8.

If the rod 2 becomes damaged, it is possible that the upper end plug 8, having a handling function, is missing from the rod 2, and the sleeve 4, which is open at its upper end, will no longer have a handling function, making it impossible to extract the rod 2 by means of the upper end plug 8.

Figure 2:
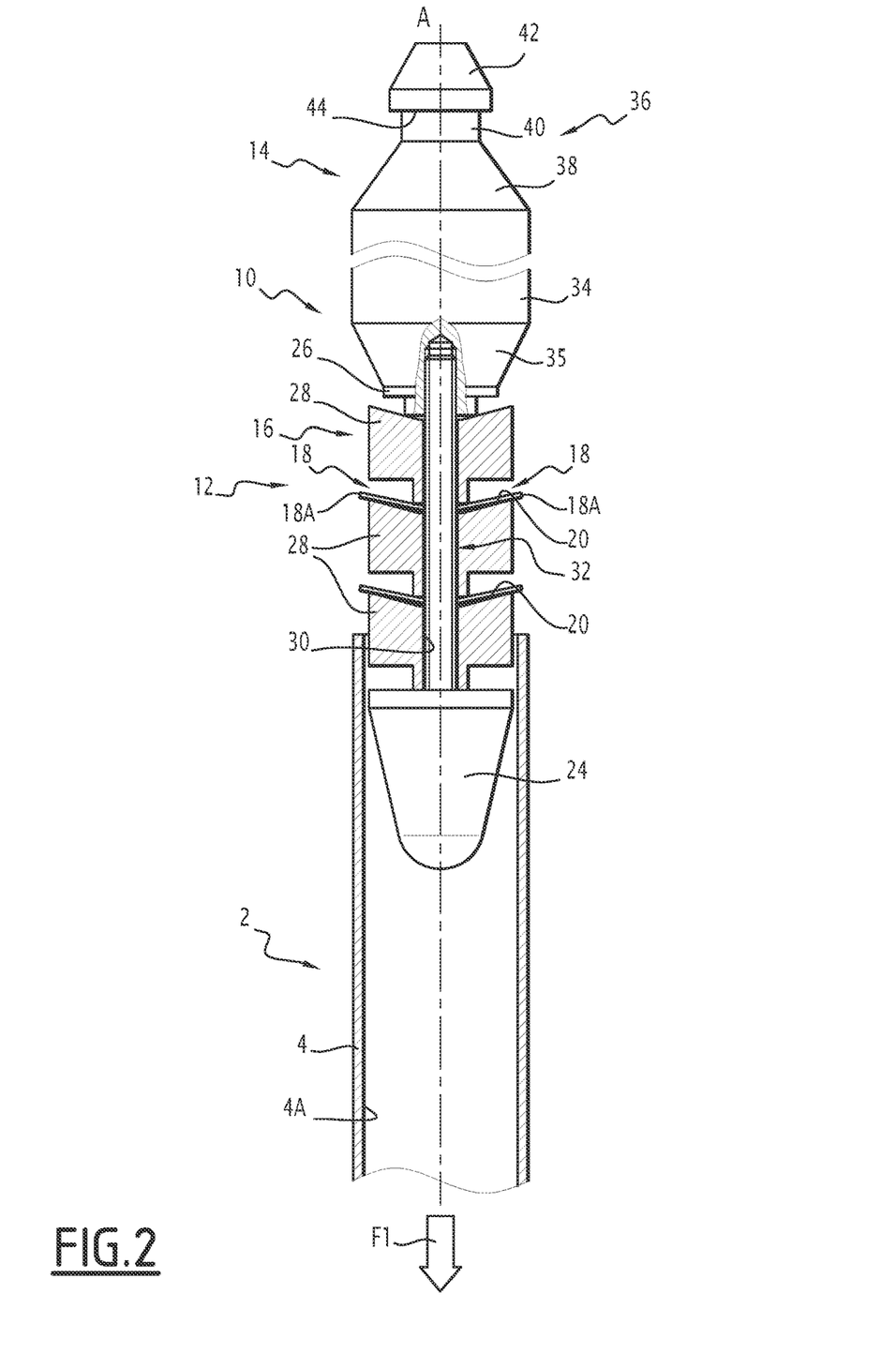
FIGS. 2 and 3 are schematic views of a damaged nuclear fuel rod without its upper end plug configured for handling and an extraction device, respectively before (FIG. 2) and after (FIG. 3) insertion of the extraction device into the rod.
Figure 3:
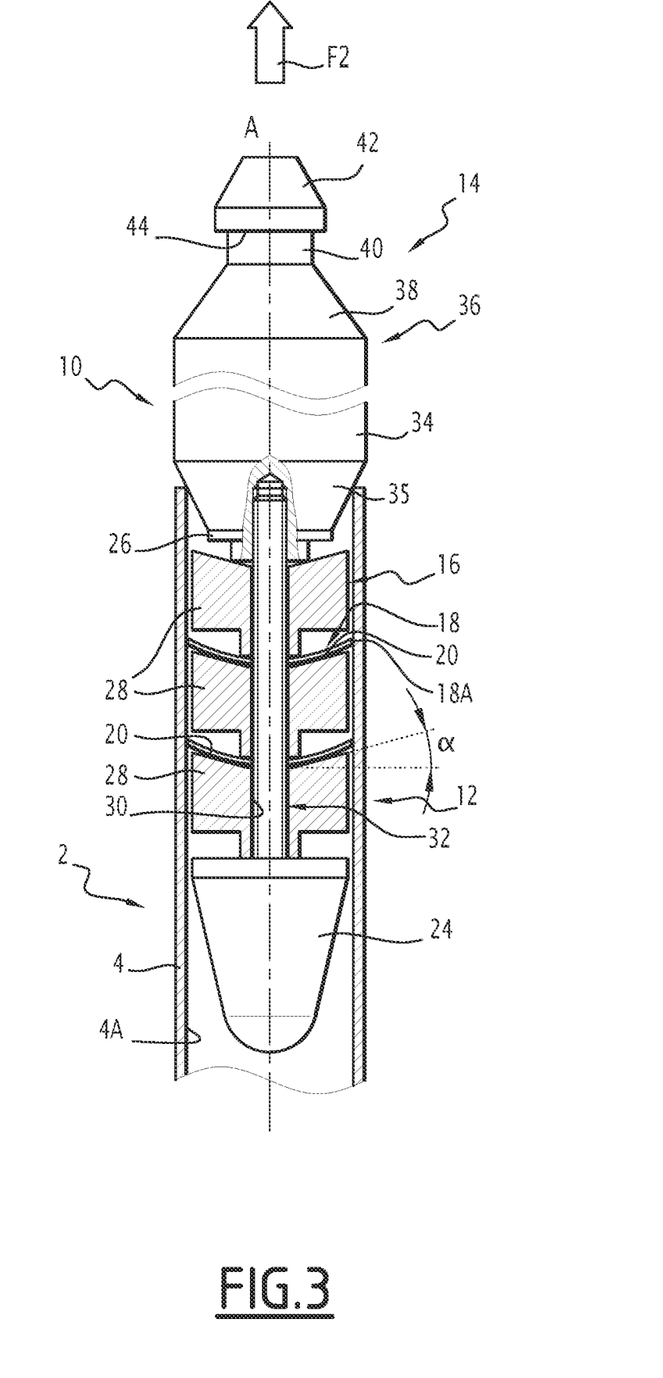

In FIGS. 2 and 3, the rod 2 is without its upper end plug 8 and the sleeve 4 is open at its upper end.

An extraction device 10 is configured to allow the rod 2 to be pulled out through a end deprived of end plug, in particular an upper end.

This extraction device 10 comprises an attachment portion 12 configured to be axially inserted into the interior of the sleeve 4 through the open upper end thereof and to be locked within the sleeve 4, and a grip portion 14 configured to be gripped by a handling tool, preferably by the same handling tool provided for extracting the undamaged rod 2, in other words, the same handling tool as that provided for gripping the missing end plug, here the upper end plug 8.

The attachment portion 12 forms a harpoon with one or more retaining teeth, in particular with several rows of retaining teeth.

The attachment portion 12 extends along a longitudinal axis A.

The attachment portion 12 is configured to be axially inserted in an insertion direction F1 (FIG. 2) inside the sleeve 4, and to mechanically lock inside the sleeve 4 with opposing a displacement of the attachment portion 12 relative to the sleeve 4 in an extraction direction F2 (FIG. 3) opposite to the insertion direction F1, by cooperation of the attachment portion 12 exclusively with the inner surface 4A of the sleeve 4.

The attachment portion 12 is forcefully insertable inside the sleeve 4.

The attachment portion 12 is, for example, configured in such a way that the insertion force, which is required to force the attachment portion 12 axially into the interior of the sleeve 4 in the insertion direction F1, is strictly less than the axial blocking force which must be overcome to extract the attachment portion 12 out of the sleeve 4 in the extraction direction F2.

Thus, it is easier to insert the attachment portion 12 inside the sleeve 4 than to extract the attachment portion 12 from the sleeve 4.

The insertion force is, for example, less than 50 daN (decanewton), preferably less than 40 daN, more preferably less than 30 daN.

The attachment portion 12 is configured in such a way that the locking force is strictly greater than the extraction force to be exerted on the rod 2 to extract the rod 2 from its assembly, increased by a safety margin.

The locking force is adjustable as a function of the predetermined extraction force. Thus the locking force is, for example, greater than 50 daN if the extraction force from the fuel assembly is 30 daN.

The attachment portion 12 comprises a body 16 extending along the longitudinal axis A and carrying one or more blades 22. Each blade 22 having one or more teeth 18, each tooth 18 projecting from the body 16 radially outward relative to the longitudinal axis A.

Each tooth 18 is configured to interfere with the inner surface 4A of the sleeve 4 so as to allow insertion of the attachment portion 12 into the sleeve 4 in the insertion direction F1, and to oppose extraction of the attachment portion 12 from the sleeve 4 in the extraction direction F2.

Each tooth 18 has a free end 18A provided for making contact with the inner surface 4A of the sleeve 4.

Each tooth 18 is configured for friction of its free end 18A against the inner surface 4A of the sleeve 4 by generating a first axial force against a displacement in the insertion direction F1 of the attachment portion 12 inside the sleeve 4, greater than a second axial force in the extraction direction F2 of the attachment portion 12 out of the sleeve 4.

Each tooth 18 is flexible in such a way as to flex rearwardly upon insertion of the attachment portion 12 into the sleeve 4 in a forward direction.

Each tooth 18 is formed, for example, by a flexible tab of the corresponding blade 22, the tab projecting radially relative to the body 16. Each blade 22 presents a thickness, taken along the longitudinal axis A, variable according to the desired axial forces.

Each blade 22 is for example metallic with good bending characteristics. Each blade 22 is for example made of steel with high elastic characteristics such as spring steel.

Each blade 22 is configured such that each tooth 18 of the blade 22 flexes backward due to insertion of the attachment portion 12 inside the sleeve 4 in the insertion direction F1, and presses, without turning back, against the inner surface 4A of the sleeve 4 against the extraction of the attachment portion 12 from the sleeve 4 in the extraction direction F2, once the attachment portion 12 has been inserted into the sleeve 4.

Figure 4:
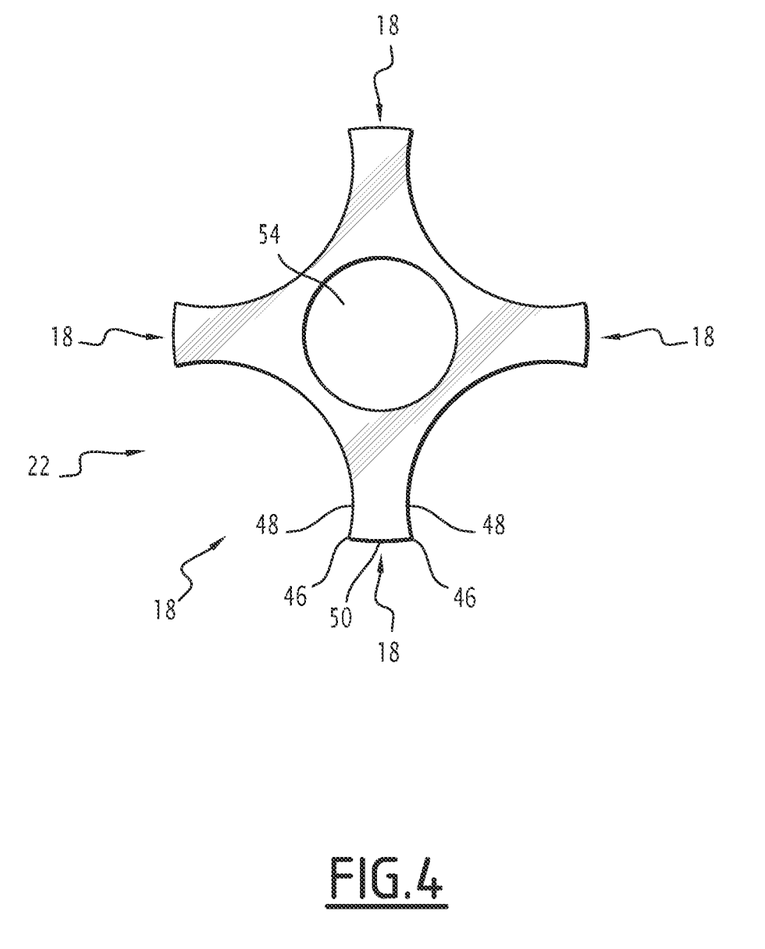
FIG. 4 is a top view of a blade of the extraction device of FIGS. 2 and 3.

As illustrated in FIG. 4, each blade 22 has, for example, a plurality of teeth 18. The number of teeth 18, here equal to four, is chosen according to the desired insertion force and locking force.

The body 16 of the attachment portion 12 comprises a bearing surface 20 associated with each tooth 18.

Each bearing surface 20 is inclined relative to the longitudinal axis A, being oriented axially toward the extraction direction F2 and radially inward. Each bearing surface 20 makes a non-zero angle α with a radial plane relative to the longitudinal axis A.

The presence of an inclined bearing surface 20 increases the force at which a tooth 18 is likely to flip during extraction, thereby improving the extraction locking force generated by that tooth 18.

The body 16 is formed here with a plurality of axial sections 28 aligned along the longitudinal axis A of the body 16, and a plurality of blades 22 carrying the teeth 18, interposed between the axial sections of the body 16.

The body 16 has a lower section 24 and an upper section 26 and intermediate sections 28 arranged axially between the lower section 24 and the upper section 26.

The blades 22 are interposed between the axial sections, each blade 22 being received between two axial sections. As illustrated in FIGS. 2 and 3, each blade 22 is for example interposed between two intermediate sections 28. Each intermediate section 28 is arranged axially between two blades 22 and forms an axial spacer for the blades 22.

Each intermediate section 28 has an axial hole 30. Each blade 22 has a central hole 54.

The attachment portion 12 comprises a central rod 32 along which the blades 22 and intermediate sections 28 are fitted alternately. The central rod 32 extends through the central hole 54 of each blade 22 and the axial hole 30 of each intermediate section 28.

The central rod 32 extends between the lower section 24 and the upper section 26 to which it is fixed.

The central rod 32 has, for example, one end welded to the lower section 24 and a threaded end screwed into a tapped hole in the upper section 26.

The lower section 24 presents a conical shape converging in the insertion direction F1. This facilitates the insertion of the attachment portion inside the sleeve 4.

The grip portion 14 comprises a cylindrical portion 34, topped by a gripping tip 36 allowing the grip portion 14 to be grasped with the help of an associated extraction tool.

The attachment portion 12 has a bearing portion 35 configured to press against an edge of the open upper end of the sleeve 4 due to the insertion of the attachment portion 12 inside the sleeve 4, so as to ensure a sealing of this open upper end of the sleeve 4 in order to thus limit the pollution, towards the outside, of the contents of the sleeve 4.

The bearing portion 35 is located between the body 16 and the grip portion 14, the bearing portion 35 being frustoconical and widening from the body 16 toward the grip portion 14, its end adjacent to the grip portion 14 presenting an external diameter larger than the internal diameter of the sleeve 4 and its end adjacent to the body 16 presenting an external diameter smaller than the internal diameter of the sleeve 4.

As can be seen in FIG. 3, due to the insertion of the attachment portion 12 inside the sleeve 4 along the insertion direction F1, the bearing portion 35 comes to press against the edge of the open upper end of the sleeve 4 and ensures a seal in order to limit the pollution, toward the outside, of the contents of the sleeve 4.

The gripping tip 36 has a conical base 38 converging in the extraction direction F2, extended by a cylindrical intermediate rod 40 of the same diameter as the upper end of the conical base 38, the intermediate rod 40 carrying a conical head 42 having a base adjacent to the intermediate rod 40 and presenting a diameter greater than that of the intermediate rod 40, in such a way as to define a radial shoulder 44 between the intermediate rod 40 and the head 42.

The gripping tip 36 is preferably identical to that of the original end of the rod 2, allowing the extraction device 10 to be grasped with the extraction tool associated with the rod 2.

As shown in FIG. 4, each blade 22 has a plurality of arms distributed about a central axis of the blade 22 that coincides with the longitudinal axis A of the device. Each arm forms a respective tooth 18.

Preferably, the teeth 18 are regularly distributed about the longitudinal axis A, and, in particular, uniformly distributed about the longitudinal axis A with a constant angular pitch between the teeth 18.

Each blade 22 here presents four arms defining four teeth 18 distributed with an angular pitch of 90° about the axis of the blade 22.

The free end 18A of each tooth 18 has two sharp corners 46, each formed by the intersection of two side edges 48 of the tooth 18 with the end edge 50 of the tooth 18. This allows to increase the locking force of the free end 18A on the inner surface 4A of the sleeve 4.

The end edge 50 of each tooth 18 defines a respective sharp corner 46 with each side edge 48 of that tooth 18. Each side edge 48 is concave, for example.

Each blade 22 is provided with a central hole 54 compatible with the size of the central rod 32, in other words, which allows insertion of the central rod 32 into the central hole 54.

The teeth 18 have sufficient flexibility and a dimension of the free end 18A suitable to allow insertion while generating with the inner surface 4A of the sleeve 4 a high locking force and having good resistance to turning back.

Figure 5:
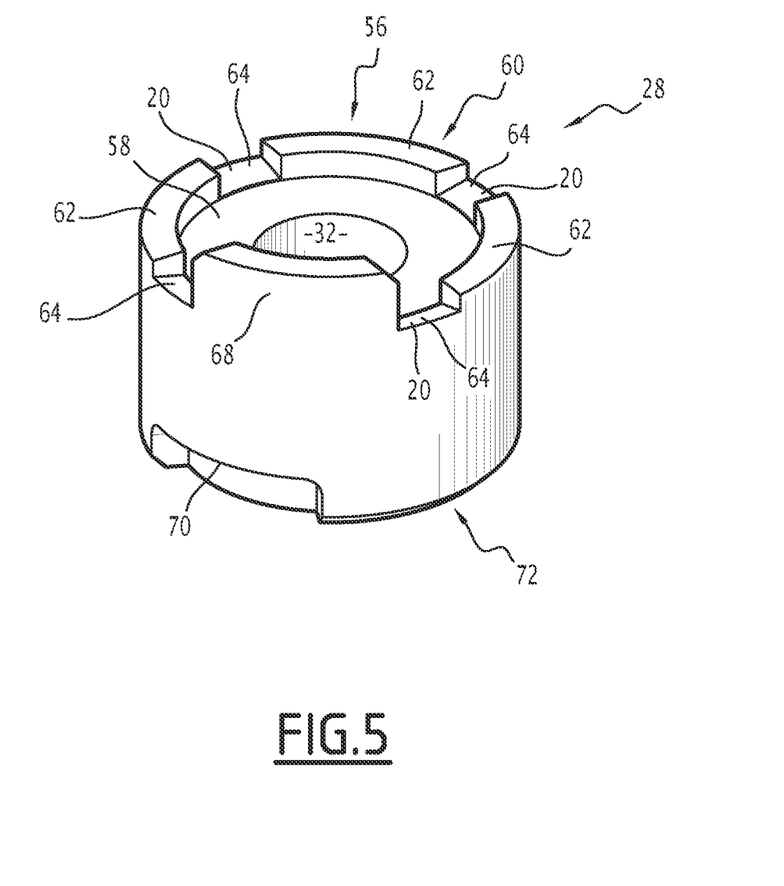
FIG. 5 is a perspective view of an intermediate axial section of the extraction device of FIGS. 2 and 3.

FIG. 5 is a perspective view of an intermediate section 28 according to a particular embodiment.

The intermediate section 28 is cylindrical and extends along the longitudinal axis A.

The intermediate section 28 has an axial upper end 56 and an axial lower end 72. The upper end 56 is provided with a housing 58 for receiving a blade 22, delimited by a discontinuous peripheral rim 60 formed by the segments 62 separated by the openings 64. The housing 58 is provided to receive the central portion of the blade 22, each tooth 18 exiting the housing 58 through a respective opening 64.

The blade 22 received in the housing 58 is angularly indexed about the longitudinal axis A relative to the intermediate section 28 due to the reception of the teeth 18 in the openings 64. Thus, each tooth 18 is angularly indexed about the longitudinal axis A relative to the body 16.

The bearing surfaces 20 are formed on the intermediate section 28. In particular, the bearing surfaces 20 are formed at the bottom of the openings 64 and inclined relative to the plane perpendicular to the longitudinal axis A to support the teeth 18 during pressing.

Each intermediate section 28 is provided with orientation elements able to be interlocked with those of other intermediate sections 28 stacked axially with this intermediate section 28, such that the stacked intermediate sections 28 are angularly offset about the longitudinal axis A, preferably with a regular angular pitch from one intermediate section 28 to the next.

Each intermediate section 28 here comprises a lug 68 projecting from the upper end 56 and a cavity 70 formed in its axial lower end 72. The cavity 70 is complementary to the lug 68 for receiving the lug of another identical intermediate section 28.

The lug 68 and the cavity 70 are angularly offset by an angular pitch β about the longitudinal axis A, to achieve the angular offset of the stacked intermediate sections 28. The angular pitch β is, for example, 5°.

Figure 6:
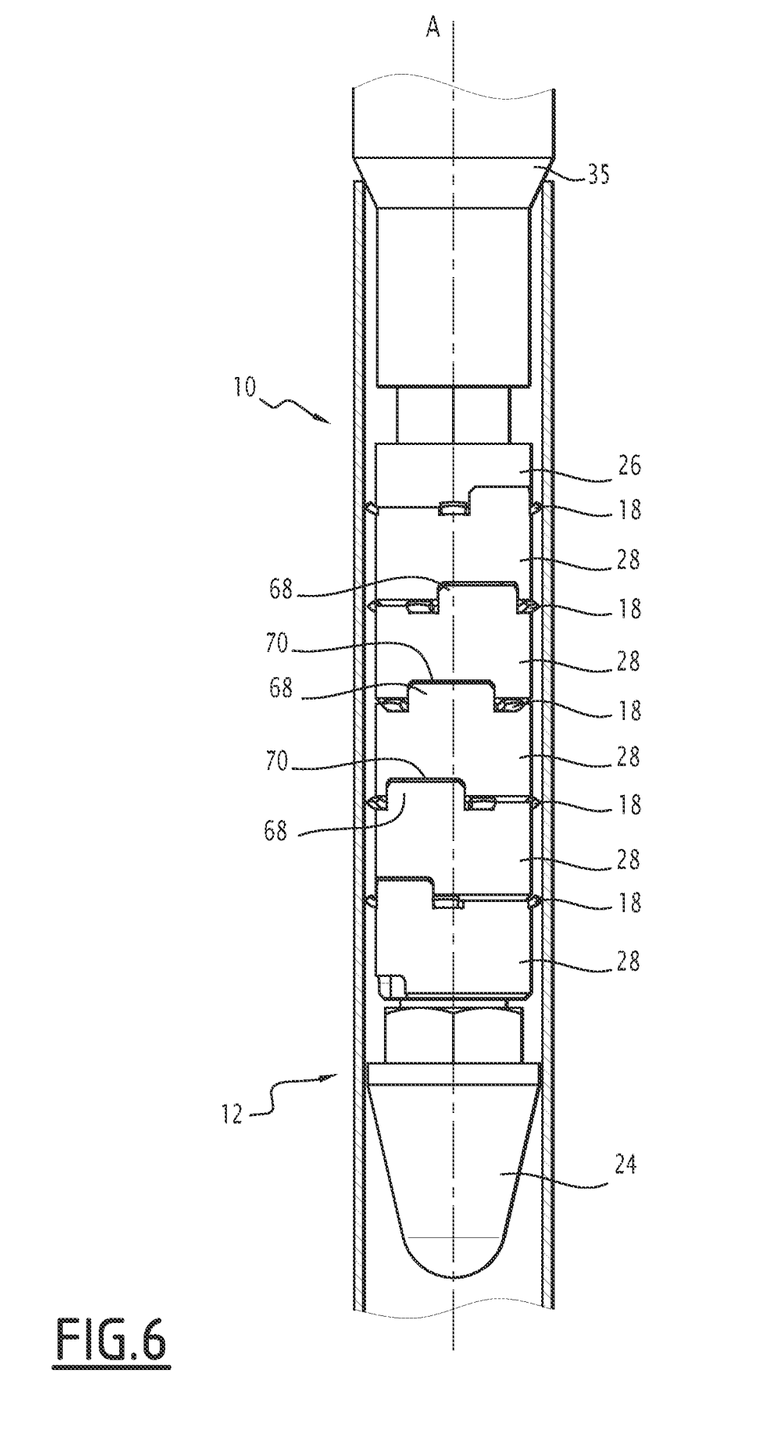
FIG. 6 is an elevation view of an extraction device according to one particular embodiment.

FIG. 6 illustrates, in elevation, an extraction device 10 made with intermediate sections 28 according to FIG. 5.

The intermediate sections 28 are angularly offset, with each intermediate section 28 being offset from the next intermediate section 28 along the angular pitch β by interlocking the lugs 68 in the cavities 70.

Here, the upper section 26 is provided with a cavity to receive the lug 68 of the first intermediate section 28.

Due to the angular offset of the intermediate sections 28, the blades 22 are angularly offset the ones relative to the others according to the angular pitch R. The teeth 18 are therefore angularly distributed around the body 16 and axially along the body 16. This promotes effective locking of the attachment portion 12 in the sleeve 4 using different generatrixes thereof.

The teeth 18 are distributed in sets of teeth arranged at the same axial position, the teeth 18 of a single set of teeth being angularly distributed around the body 16, and the sets of teeth being axially distributed along the body 16.

The sets of teeth are further angularly offset the ones relative to the others. The teeth 18 of each set of teeth are angularly offset relative to the teeth 18 of the subsequent set of teeth along the body 16.

The teeth 18 of each blade 22 here form a set of teeth arranged at the same axial position.

The extraction device 10 of FIGS. 2 and 3 is of modular construction, which allows the number of teeth 18 to be varied. In particular, the number of teeth 18 is adapted by varying the number of blades 22 and intermediate sections 28 of the body 16.

Figure 7:
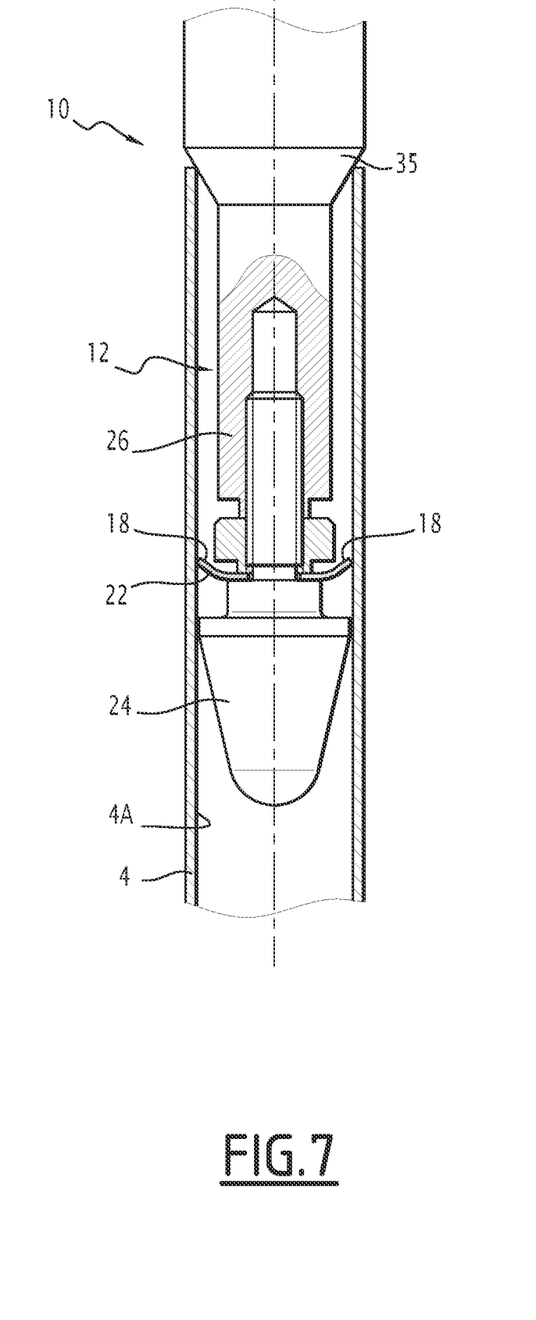
FIG. 7 is an elevation view of an extraction device according to another particular embodiment.

In the embodiment shown in FIG. 7, the extraction device 10 comprises a single blade 22 interposed between the upper section 26 and the lower section 24. The extraction device 10 is devoid of an intermediate section 28.

Returning to FIGS. 2 and 3, in operation, with the rod 2 lacking an upper end plug 8 and the sleeve 4 being open at its upper end, the user forcefully inserts the attachment portion 12 of the extraction device 10 into the open upper end of the sleeve 4. The insertion is done with an insertion force in the insertion direction F1. Once the attachment portion 12 is inserted into the sleeve 4, the attachment portion 12 is locked inside the sleeve 4 due to its teeth 18 which exclusively grip the inner surface 4A of the sleeve 4. Then, with the help of a suitable tool, the operator grasps the grip portion 14 and pulls it upward to extract the rod 2 from its nuclear fuel assembly. The clamping force is greater than the extraction force of the rod 2 from its nuclear fuel assembly, so that the lifting of the extraction device 10 allows the rod 2 to be lifted from the nuclear fuel assembly.

The extraction device 10 is simple to use and reliable. It is fixed to the sleeve 4 simply by forcefully inserting the fixing part 12 inside the sleeve 4. The extraction device 10 can only be disengaged from the sleeve 4 under a force greater than the locking force greater than the force for extracting the rod 2 out of the nuclear fuel assembly frame.

The attachment portion 12 and the grip portion 14 of the extraction device 10 form a replacement end plug replacing the original end plug of the rod 2. When inserted into the sleeve 4, the extraction device 10 closes the sleeve and prevents the exit of nuclear fuel pellets received in the sleeve 4.

The number, geometry and arrangement of the teeth 18 allow the insertion force of the extraction device 10 into the sleeve 4 and the locking force generated by the teeth 18 of the extraction device 10 inserted into the sleeve 4 to be varied. A person skilled in the art will know how to adapt the number, geometry and arrangement of the teeth 18 to the particular application.

A blade 22 as shown in FIG. 4 allows to form the teeth 18 limiting the insertion force, generating a sufficient locking force, with a limited risk of turning back.

Other tooth geometries are possible.

In one alternative, each blade 22 is circular and continuous and extends around the body 16. Each blade 22 presents, for example, the form of a washer having a continuous circular peripheral edge forming a single circular tooth.

Furthermore, the extraction device 10 has been described in connection with a nuclear fuel assembly rod. However, such an extraction device can be adapted or used for handling a damaged cluster rod, whether it is a control cluster rod or a fixed cluster rod. The latter is damaged by having lost its upper end plug which has a function of connection with the supporting structure which ensures the grouped handling of all the rods which constitute the cluster. Such a cluster rod comprises a tubular sleeve the ends of which are closed by plugs, the upper one of which has a linking function. The sleeve of a control cluster rod is more or less filled with the material that is the object of the function of the rod. The damaged rod without the upper end plug has no handling function. The extraction device 10 employed on this damaged rod remedies this by thus allowing it to be handled in the same manner as when used to handle a damaged fuel assembly rod.

What is claimed is:

1. A device for extracting a nuclear fuel rod or a cluster rod, the extraction device comprising:
   an attachment portion configured to be inserted into a sleeve of the rod through an end deprived of an end plug; and
   a grip portion, the attachment portion comprising an elongated body along a longitudinal axis and at least one tooth projecting from the body, the or each tooth being configured to allow the attachment portion to be forcibly inserted into the sleeve axially, and to engage with an inner surface of the sleeve so as to prevent the extraction of the attachment portion from the sleeve;
   the attachment portion comprising at least one blade having a plurality of arms each forming a respective tooth, the attachment portion comprising a plurality of blades axially spaced along the body, according to regular or irregular distribution.

2. The extraction device according to claim 1, wherein the or each tooth is configured to oppose extraction of the attachment portion from the sleeve by pressing the teeth against the inner surface of the sleeve.

3. The extraction device according to claim 1, wherein the attachment portion comprises a plurality of teeth angularly distributed about the body.

4. The extraction device according to claim 1, wherein the attachment portion comprises regularly angularly distributed teeth and/or uniformly angularly distributed teeth.

5. The extraction device according to claim 1, wherein the attachment portion comprises a plurality of teeth distributed axially along the body.

6. The extraction device according to claim 1, wherein the blades are angularly offset from one another.

7. The extraction device according to claim 1, wherein the body comprises a plurality of axial sections stacked axially alternating with blades.

8. The extraction device according to claim 7, wherein the axial sections comprise one or more intermediate sections interposed between two blades.

9. The extraction device according to claim 7, wherein the axial sections and the blades are stacked along a central shaft.

10. The extraction device according to claim 7, wherein the body comprises axial sections each having angularly offset interlocking orientation elements, such that two axially stacked sections are angularly offset due to the interlocking of their orientation element.

11. The extraction device according to claim 1, wherein the attachment portion has an abutment portion configured to press against an edge of the end of the sleeve due to the insertion of the attachment portion inside the sleeve, so as to provide a seal.

12. The extraction device according to claim 1, wherein the attachment portion has a bearing surface associated with each tooth, each bearing surface being arranged so that the tooth comes to press against the bearing surface in the event of a force applied to the extraction device in a direction of extraction of the attachment portion from the sleeve.

13. The extraction device according to claim 12, wherein each bearing surface is inclined with respect to the longitudinal axis and faces:
  axially in the direction of extraction of the attachment portion from the sleeve; and
  radially inward toward the longitudinal axis.

14. An assembly comprising:
  a nuclear fuel rod or a cluster rod; and
  the extraction device according to claim 1, adapted for insertion and locking of its attachment portion within the sleeve of the rod.

15. A method for extracting a nuclear fuel rod or a cluster rod from a nuclear fuel assembly, the sleeve of the rod being deprived of an end plug at one end, the method comprising:
  forcibly inserting the attachment portion of the extraction device according to claim 1 into the open end of the sleeve; and then
  pulling the grip portion of the extraction device to extract the rod from its nuclear fuel assembly.

16. A device for extracting a nuclear fuel rod or a cluster rod, the extraction device comprising:
  an attachment portion configured to be inserted into a sleeve of the rod through an end deprived of an end plug; and
  a grip portion, the attachment portion comprising an elongated body along a longitudinal axis and at least one tooth projecting from the body, the or each tooth being configured to allow the attachment portion to be forcibly inserted into the sleeve axially, and to engage with an inner surface of the sleeve so as to prevent the extraction of the attachment portion from the sleeve;
  attachment portion comprising at least one blade having a plurality of arms each forming a respective tooth,
  the body comprising a plurality of axial sections stacked axially alternating with blades.

* * * * *